W. S. HOUGH, Jr.
METHOD OF AND MEANS FOR FORMING GLASS ARTICLES.
APPLICATION FILED NOV. 8, 1916.

1,236,938.

Patented Aug. 14, 1917.
2 SHEETS—SHEET 1.

WITNESSES
Howard D. Orr
F. T. Chapman

William S. Hough, Jr. INVENTOR,
BY E. G. Siggers
ATTORNEY

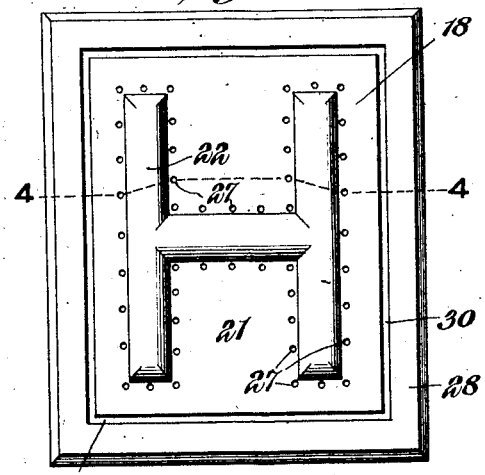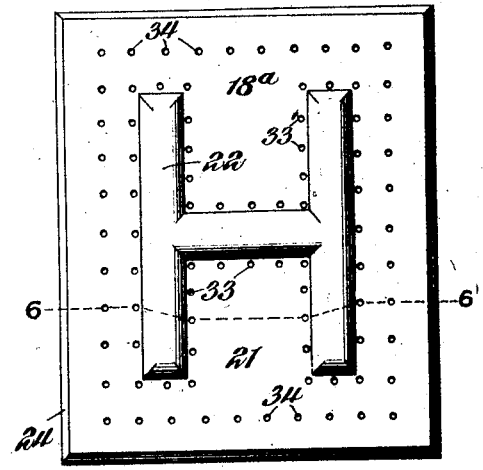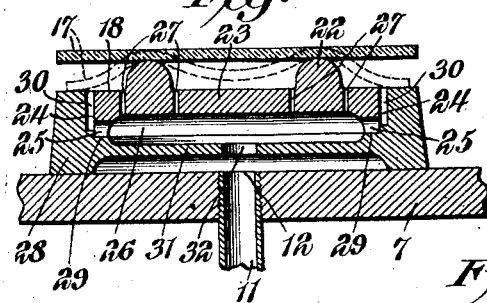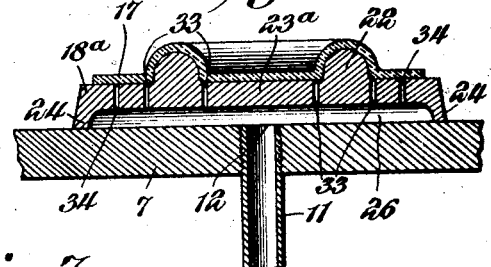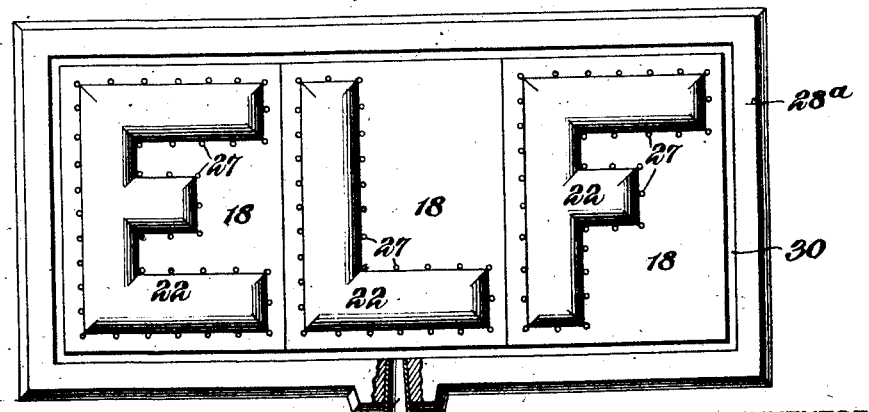

UNITED STATES PATENT OFFICE.

WILLIAM S. HOUGH, JR., OF ST. CATHERINES, ONTARIO, CANADA.

METHOD OF AND MEANS FOR FORMING GLASS ARTICLES.

1,236,938. Specification of Letters Patent. Patented Aug. 14, 1917.

Original application filed June 3, 1916, Serial No. 101,588. Divided and this application filed November 8, 1916. Serial No. 130,172.

*To all whom it may concern:*

Be it known that I, WILLIAM S. HOUGH, Jr., a citizen of the United States, residing at St. Catherines, Province of Ontario, Dominion of Canada, have invented a new and useful Method of and Means for Forming Glass Articles, of which the following is a specification.

This invention has reference to the method of and means for producing glass articles, and especially the formation of articles from sheet glass. The object of the invention is to expeditiously form such articles while the sheet glass is softened by heat, whereby the formed article is in hollow relief upon the sheet of glass with a plane or smooth portion of the sheet bordering the relief part.

In the use of the term sheet, it is to be understood in the sense of applying to a plane or approximately plane structure extended in two dimensions and relatively thin in the third dimension, and by the term glass is meant any substance having characteristics of glass in that it may be treated in substantially the same manner as a glass sheet for the formation of portions of the sheet into hollow relief.

In accordance with the present invention the glass sheet, heated to a suitable degree of plasticity, is placed upon a suitable mold having a relief pattern of the portion to be in relief so disposed that a condition of subatmospheric pressure may be established on the mold side of the softened sheet, whereupon the latter is forced into conformity with the pattern of the mold by atmospheric pressure. The glass sheet is caused to engage the mold about the pattern and is there held to the mold by atmospheric pressure due to the production of subatmospheric pressure where the border portions of the glass sheet rest upon the mold, and then the remainder of the sheet is forced into intimate conformity with the mold by atmospheric pressure exerted thereupon. The softened glass sheet is thereby made to first strongly adhere to the mold about the pattern and to then conform to the mold by atmospheric pressure, and this is accomplished with such expedition that the effect is practically instantaneous.

The mold is so constructed that suction or subatmospheric conditions may be established acting first upon the glass sheet exterior to the margins of the pattern, thus fastening the sheet firmly in place, and then atmospheric pressure immediately acts upon the remainder of the sheet conforming it closely to the mold and this without any mechanical holding means, the action being wholly pneumatic.

The invention will be best understood from a consideration of the following detailed description, taken in connection with the accompanying drawings, forming part of this specification, with the further understanding that while the drawings show a practical form of the invention the latter is not confined to any strict conformity with the showing of the drawings, but may be changed and modified so long as such changes and modifications come within the scope of the appended claims.

In the drawings:—

Fig. 3 is a plan view of a type of mold where the pattern-containing portion of the mold is provided with, and is separable from a surrounding container.

Fig. 4 is a section on the line 4—4 of Fig. 3.

Fig. 5 is a plan view of a different form of mold from that shown in Fig. 3.

Fig. 6 is a section on the line 6—6 of Fig. 5.

Fig. 7 is a plan view of a mold similar to Fig. 3 except that it provides for a plurality of pattern elements.

The present application is a division of my application No. 101,588, filed June 3, 1916, for the method of and means for forming glass articles.

Figure 1:
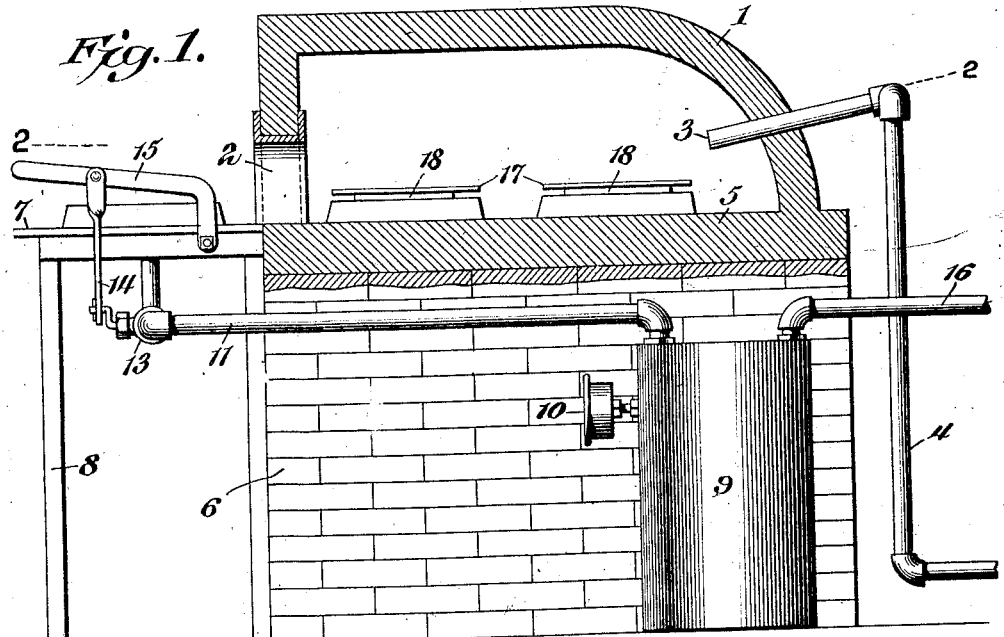
Figure 1 is an elevation of a structure for the practice of the present invention, including a heating oven shown in the figure in longitudinal vertical section.
Figure 2:
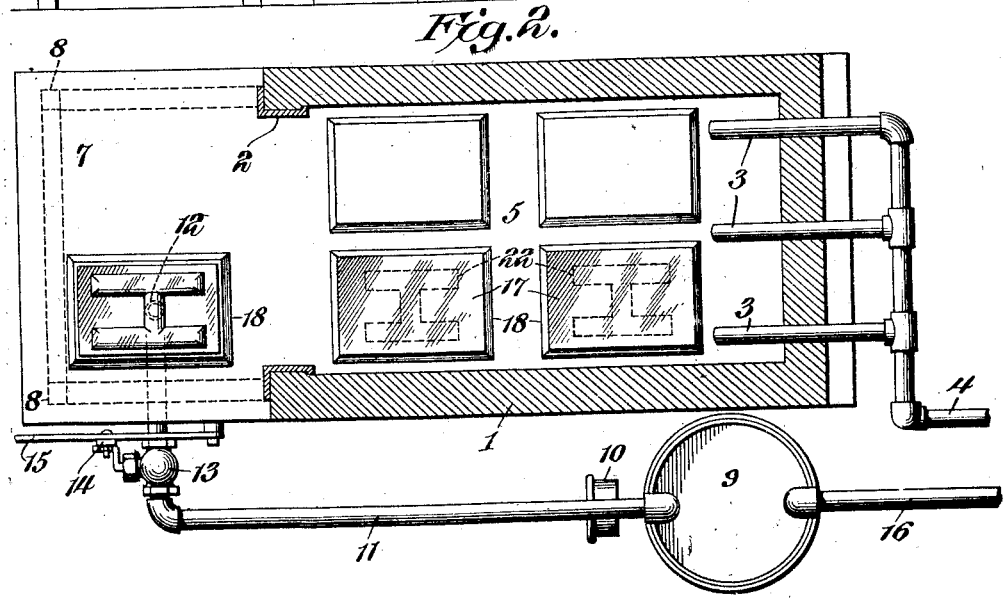
Fig. 2 is a sectional view on the line 2—2 of Fig. 1.

Referring to the drawings, there is shown in Figs. 1 and 2 a furnace 1 having at one end an entrance opening 2, and at the other end provided with burners 3, which latter have exterior connections 4 to any suitable source of fuel, such, for example, as gas. Since the interior of the furnace is in operation subjected to considerable heat, it is made heavy and of refractory materal to withstand the heat, while such heat need only be intense enough to soften the glass without causing it to become soft enough to spontaneously flow. The furnace chamber has a bottom member 5 supported upon a suitable base 6, which, as indicated in the drawings, may be made of brick. Extending from the opening 2 is a table 7 carried by legs 8 or otherwise, and has its top in the same plane as the upper surface of the bottom 5 of the furnace, while both the table top and the upper surface of the bottom 5 are plane.

At one side of the furnace at some convenient point is a tank 9 provided with a vacuum gage 10 and a pipe 11 leading from the tank to and opening through the table 7 near one side thereof, the opening being indicated at 12 in Fig. 2. The pipe 11 includes a controlling valve 13 having its stem connected by a link 14 to an operating lever 15 at that side of the table near the opening 12. The desired degree of subatmospheric pressure is maintained in the tank 9 by suitable suction apparatus connected to the tank by a pipe 16.

The material to be operated upon is in the form of glass sheets, indicated at 17, and these sheets are of suitable size and usually substantially flat.

Molds 18 or 18$^a$ are provided and vary in size and outline, but for convenience of description will be considered as substantially rectangular. Moreover, while different substances will answer for the formation of the molds, they may conveniently be made of iron. Each mold is shown as having in the main a plane surface 21 having within its margins and in spaced relation to its edges a relief pattern 22 corresponding in shape to the relief design to be produced upon the glass plate 17.

For convenience of illustration and description the patterns will be assumed as letters of the alphabet, but it will be understood that the patterns may be of various kinds, of which the letters shown are to be taken merely as indicative of any kind of sign indicia, such as letters, numbers, or the like, or conventional, fanciful, or other forms. Moreover, the characters or indicia are useful for various purposes, but are usually employed, and for purposes of convenience of description will be considered as used in connection with illuminating signs. For these reasons, and for the sake of simplicity of description the relief designs formed on the glass sheets will hereinafter be referred to as sign characters without thereby limiting them to either specific forms or specific uses.

Each mold has a bottom wall 23 or 23$^a$ somewhat raised above the plane of the bottom of the mold by marginal walls 24, which, in the case of the mold 18, have lateral passages 25 therethrough. There is therefore provided a chamber 26 underneath the mold. Extending through the wall 23 are numerous perforations 27 substantially outlining the relief portions 22 defining the patterns.

In the case of the mold 18 there is an additional mold element or container 28 in the form of a block suitably hollowed out to receive the mold element 18. The interior of the block 28 near its margins is formed with shoulders 29 so positioned that when the mold 18 is lodged in the block there is provided a space or channel 30 all about the mold between its outer edges and inner walls of the block 28. The passage or channel 30 when the mold is seated in the block 28 communicates with a chamber 26 through the passages 25.

In the particular showing of Fig. 4 the block 28 is provided with a raised bottom portion or web 31 with a passage 32 therethrough, so that when the block is placed over the opening 12 in the table 7 subatmospheric conditions may be established within the chamber 26 which communicates through the passages 25 with the channel 30 and through other passages 33 about the relief portion 22 of the mold and closely outlining the strokes of the sign character.

In the case of the mold 18$^a$ there are perforations 33 as in the mold 18, but instead of the channel 30 the mold is sufficiently extensive to accommodate a series of perforations 34 exterior to the perforations 33, and so arranged as to replace the channel 30 produced between the mold 18 and the block 28 when the mold is in the block. In either case what constitutes the top surface of the mold or the mold and block 28 combined is plane.

The glass sheet 17 if now softened by heat will of its own weight collapse to an extent until the marginal portions of the glass sheet rest upon the top surface of the mold, or of the mold and block or container 27 when the two are associated. The collapsed sheet now covers the passages or channels 30, or the perforations 34, as the case may be, and there is produced a condition of subatmospheric pressure causing the marginal portions of the plate 17 to closely hug the top surface of the mold, which may be considered as including the container 28 when such structure is employed. This, of course, then causes a condition of subatmospheric pressure to exist beneath the plate 17 throughout its area, whereupon atmospheric pressure acting against the outer or exposed surface of the plate 17 affects such plate wherever unsupported by the mold and especially by the relief portion thereof. The result is that the softened glass plate is forced into close association with the plane surface of the mold and also in close hugging relation to the relief portions of the mold. This conforms the softened glass plate closely to the pattern on the mold, the successive actions being so quick that for all practical purposes they may be considered as instantaneous. The glass plate being first pneumatically clamped to the mold exterior so the plate is forced to conform to the pattern without distortion and wrinkling of the marginal portions, which is found to occur where the edges of the plate are not held down against the mold. Heretofore it has been the custom to hold glass articles to be molded by air pressure by the use of mechanical clamping or holding means at the marginal portions, the softened glass then stretching to enable it to conform to the mold. This required considerable mechanism and the adjustment of parts. With the present invention the clamping is entirely pneumatic and also automatic, and while the clamping and the formation of the softened glass plate into strict conformity with the relief portions of the mold is actually successive, they are in effect simultaneous, since the time element between the two actions is negligible.

In the case of the structure of Figs. 5 and 6 no container 28 is needed, for the mold 18ª may rest directly upon the plate or table 7.

It is quite feasible to form a material part of or, in fact, an entire sign of one sheet of glass with the sign containing two or more characters. This is illustrated in Fig. 7 where there are three molds 18 seated in a single container 28ª.

While with respect to the structures of Figs. 3 to 6 the molds or the containers in which the molds are seated are supported upon the table 7 in position to have the air exhausted through the pipe 11, the container 28 may have a passage 35 through one side wall for the reception of a pipe through which the air may be exhausted. This structure permits shaping of the plates in conformation with the molds while the whole structure is in the furnace, and does not require the withdrawal of the mold with the softened glass plate thereon before subatmospheric conditions are produced. Moreover, such arrangement does away with the necessity of machining the bottoms of the molds, thus cheapening their construction, since neither the molds nor the table 7 need be so strictly plane as is necessary where nonleakable conditions are needed.

While in illuminated signs letters, numbers and the like are employed, it is also customary to produce medallions or ornamental configurations of glass, the surfaces of which may have lettering, or other indicia produced thereon by painting or by other methods, but the medallion itself may be formed of glass with the parts in relief in the manner hereinbefore described.

Furthermore, the invention is applicable to the production of hollow dishes and various glass articles, so that it is evident that the invention is adapted to the production of a great variety of articles for formation in relief in addition to such articles or formations as would be strictly included under the term sign character.

What is claimed is:—

1. The method of forming glass plates with portions in relief thereon, which consists in subjecting the plate while supported upon a relief pattern to the action of heat to soften the plate until it spontaneously gravitates to a lower position where unsupported by the relief portions, and then producing a condition of subatmospheric pressure on the face of the plate remote from that from which the relief portions are to project and at the same time holding the plate exterior to the outlines of the relief portion against distortion by the action of suction producing subatmospheric conditions.

2. The method of forming glass plates with portions in relief thereon, which consists in supporting the plate on a mold with the design in relief, softening the glass plate by heat until the marginal portions of the glass plate exterior to the pattern gravitate toward the body of the mold, and subjecting the glass plate to the action of atmospheric pressure by producing subatmospheric pressure on the face of the glass plate toward the mold, whereby the glass plate is made to conform to the pattern while the plate is held at its margins against distortion forces.

3. The method of forming glass plates with portions in relief thereon, which consists in supporting the glass plate upon a pattern in relief on a mold, subjecting the glass plate to heat sufficient to soften it until the marginal portions of the plate drop toward the body of the mold and subjecting that face of the plate remote from the face from which the relief pattern is to project to the action of subatmospheric pressure at the marginal portions of the plate exterior to the pattern and also closely adjacent to the outlines of the pattern, whereby the softened glass plate is pneumatically secured to the mold at its marginal portions and is forced into close conformity with the mold by atmospheric pressure.

4. The method of forming glass plates into glass articles with patterns in relief thereon, which consists in supporting a glass plate upon a mold having a pattern in relief thereon, softening the glass plate by heat, and then subjecting the glass plate to subatmospheric conditions on the face of the plate remote from that on which the relief pattern is to be produced with the glass plate held at the marginal portions exterior to the pattern by atmospheric pressure due to the production of subatmospheric conditions beneath the plate, whereby the marginal portions of the plate are held against distortion while the remainder of the plate is being conformed to the pattern.

5. The method of forming glass sheets or plates with sign characters or other forms in relief, consisting in subjecting the glass sheet, while upon a mold with the conformations in relief thereon and while the glass sheet is softened by heat sufficient to cause the edges of the glass sheet to fall to the surface of the mold, to the action of atmospheric pressure by producing subatmospheric conditions between the glass sheet and the surface of the mold both in the immediate neighborhood of the relief portions of the mold and at parts more distant from the relief portion of the mold, whereby the marginal portions of the glass sheet are held firmly against the surface of the mold by atmospheric pressure and the glass sheet is made to conform closely to the mold by atmospheric pressure.

6. A means for the production of sign characters or other formations in relief upon glass sheets or plates, comprising a mold with a pattern in relief thereon, said mold having air passages through it in the immediate neighborhood of the pattern, and other air passages more distant from the pattern than the first-named passages, whereby subatmospheric conditions may be produced about the outlines of the relief portions and at points spaced therefrom to hold the glass plate to the face of the mold and prevent distortion of the marginal portions while the glass plate is being conformed to the relief pattern on the mold.

In testimony that I claim the foregoing as my own, I have hereto affixed my signature in the presence of two witnesses.

WILLIAM S. HOUGH, Jr.

Witnesses:
 H. B. ZEBOLD,
 A. R. WHITE.